United States Patent
Milde et al.

(10) Patent No.: US 7,266,958 B2
(45) Date of Patent: Sep. 11, 2007

(54) WATER SEPARATOR FOR AIR-CONDITIONING SYSTEMS

(75) Inventors: Bertram Milde, Weiler (DE); Georg Baldauf, Lindenberg (DE)

(73) Assignee: Liebherr-Aerospace Lindenberg GmbH, Allgaeu (DE)

( * ) Notice: Subject to any disclaimer, the term of this patent is extended or adjusted under 35 U.S.C. 154(b) by 171 days.

(21) Appl. No.: 11/190,557

(22) Filed: Jul. 27, 2005

(65) Prior Publication Data

US 2006/0021356 A1 Feb. 2, 2006

(30) Foreign Application Priority Data

Jul. 28, 2004 (DE) .................. 10 2004 036 568

(51) Int. Cl.
*F25D 21/00* (2006.01)
*F25D 21/14* (2006.01)

(52) U.S. Cl. .................. 62/150; 62/285; 55/319; 55/384; 96/262

(58) Field of Classification Search .......... 62/92, 62/93, 150, 171, 285, 498; 55/319, 348, 55/396; 96/262

See application file for complete search history.

(56) References Cited

U.S. PATENT DOCUMENTS

| | | | | |
|---|---|---|---|---|
| 2,921,646 | A | | 1/1960 | Poole |
| 3,488,927 | A | * | 1/1970 | Jepsen et al. .................. 96/262 |
| 3,834,127 | A | * | 9/1974 | Jordan et al. .................. 96/260 |
| 4,238,210 | A | * | 12/1980 | Regehr et al. ................. 55/396 |
| 4,349,360 | A | | 9/1982 | Schuurmans et al. |
| 4,566,883 | A | * | 1/1986 | Paardekooper et al. ........ 55/329 |
| 4,602,925 | A | * | 7/1986 | Huffman ........................ 55/457 |
| 4,629,481 | A | * | 12/1986 | Echols ........................ 55/348 |
| 4,681,610 | A | * | 7/1987 | Warner ......................... 55/394 |
| 4,769,050 | A | | 9/1988 | Shaw et al. |
| 4,850,426 | A | * | 7/1989 | Fayolle et al. ............... 165/111 |
| 4,997,549 | A | * | 3/1991 | Atwood ....................... 209/164 |
| 5,300,132 | A | * | 4/1994 | Konijn ........................ 96/306 |
| 5,800,582 | A | | 9/1998 | Palmer et al. |
| 6,331,195 | B1 | * | 12/2001 | Faust et al. .................... 55/396 |
| 6,426,010 | B1 | | 7/2002 | Lecoffre et al. |
| 6,524,373 | B2 | * | 2/2003 | Afeiche et al. ............... 95/269 |
| 6,619,054 | B1 | * | 9/2003 | Cargnelli et al. .............. 62/93 |
| 6,666,338 | B1 | | 12/2003 | Henriksson et al. |

(Continued)

FOREIGN PATENT DOCUMENTS

DE 848 348 C 9/1952

(Continued)

*Primary Examiner*—Mohammad M. Ali
(74) *Attorney, Agent, or Firm*—Carter, Deluca, Farrell & Schmidt, LLP

(57) ABSTRACT

The invention relates to a water separator for air-conditioning systems, preferably for aircraft air-conditioning systems, comprising a swirl generator, a housing surrounding it, a separation chamber arranged around the housing for the collection of the water separated at the inner wall of the housing, which opens in a separation sump, and at least one opening provided toward the separation chamber in the housing. In accordance with the invention, the separation chamber is made in multistage form, with the first stage of the separation chamber serving the accumulation of the water drops, the second stage of the separation chamber serving the deposition of the accumulated water drops and the third stage of the separation chamber serving the extraction of the air mass flow.

11 Claims, 3 Drawing Sheets

U.S. PATENT DOCUMENTS

Figure 1:
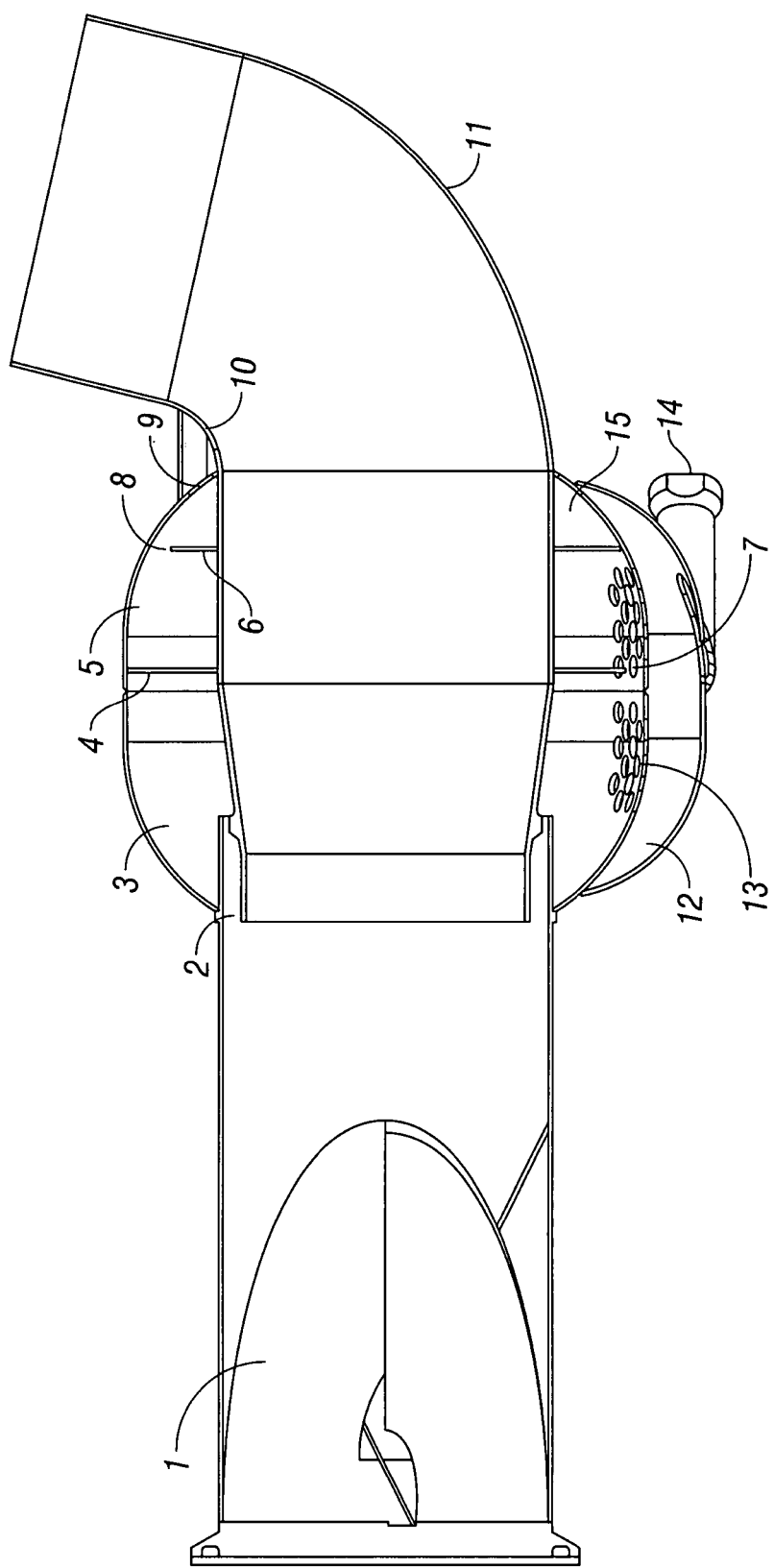

2002/0189995 A1 12/2002 Bruckmann et al.
2003/0115843 A1 6/2003 Haland

FOREIGN PATENT DOCUMENTS

| DE | 23 38 913 A1 | 3/1975 |
| DE | 37 03 358 A1 | 8/1987 |
| GB | 832 255 A | 4/1960 |
| GB | 1 089 311 A | 11/1967 |
| WO | WO99/59867 | 11/1999 |
| WO | WO 03/092850 A1 * | 11/2003 |

* cited by examiner

WATER SEPARATOR FOR AIR-CONDITIONING SYSTEMS

The invention relates to a water separator for air-conditioning systems, preferably for aircraft air-conditioning systems in accordance with the preamble of claim 1.

Currently, so-called drop water separators are being used in a large number of aircraft air-conditioning systems made. These separators have an elongate, tubular construction shape. The damp, charged air is set into a swirling movement downstream of the entry aperture by means of a swirl generator and the drops are transported into the inner wall of the water separator by centrifugal acceleration. Further downstream, these water drops are separated via an annular gap extending into the separation chamber. This method permits high degrees of separation of large water drops for specific average flow speeds of the damp air mass flow. The degree of separation is much wore with smaller spray-like or mist-like drops. This principle also shows a considerable loss of separation degree which cannot be neglected at flow speeds increased with respect to the design point. Finally, the drop water separator has some disadvantages with respect to the installation and integration in the cooling unit due to the required construction length since a length is required between the swirl generator and the annular gap extending into the separation chamber which at least corresponds to the amount of the outer diameter in order to achieve high degrees of separation. Drops already deposited on the inner wall of the water separation housing can moreover be swept along by the high flow speeds of 15 to 20 m/s in the water separator. Deposited water is in particular atomized again at the end edges of the swirl generation vanes, whereby spray-like and mist-like drops are created which cannot be separated again due to the short path distance between the swirl generator and the separation chamber (annular gap) and the short active time of the centrifugal force resulting therefrom.

A slight shortening of the construction length of drop separators can be achieved by the use of a two-stage separation such as has already been proposed in U.S. Pat. No. 6,524,373 B2. In contrast to a drop separator such as was initially described, two separation chambers are positioned behind one another here. This results in the advantage that the risk of drops already deposited on the inner walls being swept along is reduced since they are separated immediately after the deposit in the first stage. This is made possible since the first separation chamber is positioned upstream closer to the swirl generator than in the single-stage separator.

The entry aperture and exit aperture of the separator described in U.S. Pat. No. 6,524,373 B2 are further apart due to the unit design so that the demands of an increasingly more compact configuration of the components of the aircraft cooling unit can be satisfied. A substantial increase in the degree of separation for mist-like drops cannot be achieved with this separator. This embodiment in particular does not show any substantial improvement in the achievable degrees of separation in comparison with the described conventional drop separators in aircraft air-conditioning systems. Finally, it is also not possible to realize lower values with respect to the pressure loss.

The previously used drop separation principle has the disadvantage that the degrees of separation to be achieved can be negatively influenced at higher separation chamber pressures.

A drop separator having measures to reduce the separation chamber pressure is showed by DE 370 335 8 C2 and also by DT 233 891 3 A1. In this embodiment—as with the conventional drop separators—the separation chamber is in communication with the main air flow by means of an inlet section. The moisture-free air flowing through the separation chamber is moreover again supplied to the main air flow downstream of the separation chamber via a discharge section (ejector). This results in a reduction in the separation chamber pressure and in the leak air portion. The flow guidance through the separation chamber is delayed (continuously in DE 370 335 8 C2; by widening in the deflection region in DT 233 891 3 A1) and deflected a multiple of times due to the labyrinth-like shape of the flow guidance, which promotes the precipitation of the water drops.

This embodiment has the disadvantage due to the complex geometry of the separation chamber that both a very large construction length of the separator and a large diameter of the separation chamber make the integration into the cooling unit more difficult or that the flexibility of the component configuration in the cooling unit is substantially restricted by the water separator. This embodiment likewise results in a much higher component weight in comparison to a conventional drop separator due to the principle involved. No substantial improvement with respect to the pressure loss can be achieved with this embodiment in comparison with conventional drop separators A solution for a compact embodiment of a water separator for aircraft air-conditioning systems is shown in U.S. Pat. No. 5,800,582 A. The embodiment proposed here is made as a drop separator in which the moisture-charged fresh-air flow flowing inward in an inlet tube arranged off-center is conveyed toward a semi-spherical baffle apparatus. Due to the mass forces of inertia, the water drops are transported in the direction of the rim boundary edges of this baffle apparatus. The drops are there separated from the moisture-charged fresh-air flow with the help of a peripheral collection channel. The moisture-free air flow is transported in the direction of the discharge aperture via an air passage. Due to the great deflection of the moisture-charged fresh-air flow, high pressure drops have to be accepted here in order to achieve good degrees of separation. A sweeping along of water drops with the main air flow can likewise not be fully avoided due to the strong flow deflection.

It is the object of the present invention to provide a water separator for air-conditioning systems in which the disperse phase can be separated from a moisture-charged air mass flow, wherein a high stability of the separation performance is ensured with respect to changed input parameters, i.e. for example the mean flow speed, the moisture charge and the system pressure.

This object is solved in accordance with the invention by the combination of the features of claim 1. Here, a water separator for air-conditioning systems having a swirl generator, a housing surrounding the latter, a separation chamber arranged around this housing for the collection of the water separated at the inner wall of the housing, which opens into a separation sump, and at least one opening provided toward the separation chamber in the housing is further developed in that the separation chamber is made in multiple stages, with the first stage of the separation chamber serving an accumulation of the water drops, the second stage of the separation chamber serving the deposition of the accumulated water drops and the third stage of the separation chamber serving the extraction of the air mass flow. The recognition therefore forms a material point of the invention that an active venting of the multi-stage separation chamber ensures a high stability of the separation performance with respect to changed input parameters.

Preferred aspects of the invention result from the subordinate claims dependent on the main claim.

Accordingly, the three stages of the separation chambers can be formed in that a baffle surface separates the first stage from the second stage and a partition wall separates the second stage from the third stage.

A further advantageous aspect of the invention consists of at least one respective opening being provided in the baffle surface separating the first stage from the second stage, on the one hand, and in the partition wall separating the second stage from the third stage, on the other hand.

In accordance with a further advantageous aspect of the invention, the three stages and their associated functions can be realized in assemblies separated from one another.

The extraction of the air mass flow can take place from an assembly downstream of the second stage by internal delivery into the primary mass flow.

In this process, the internal extraction of the air mass flow and the internal delivery into the primary mass flow can take place by means of an anti-Pitot tube. The internal extraction of the air mass flow and the internal delivery into the primary mass flow can take place by means of tapping the inner radius of a downstream manifold.

The internal extraction of the air mass flow and the internal delivery into the primary mass flow can take place by means of an ejector in the shape of an annular gap.

The extraction of the air mass flow can take place from an assembly downstream of the second stage by venting into the environmental air. On the other hand, the extraction of the air mass flow from an assembly downstream of the second stage can be made possible by delivery into an external mass flow.

The external mass flow can be the process air side of an aircraft air-conditioning system.

Further details and advantages of the invention will be explained with reference to embodiments shown in the drawing.

Figure 2:
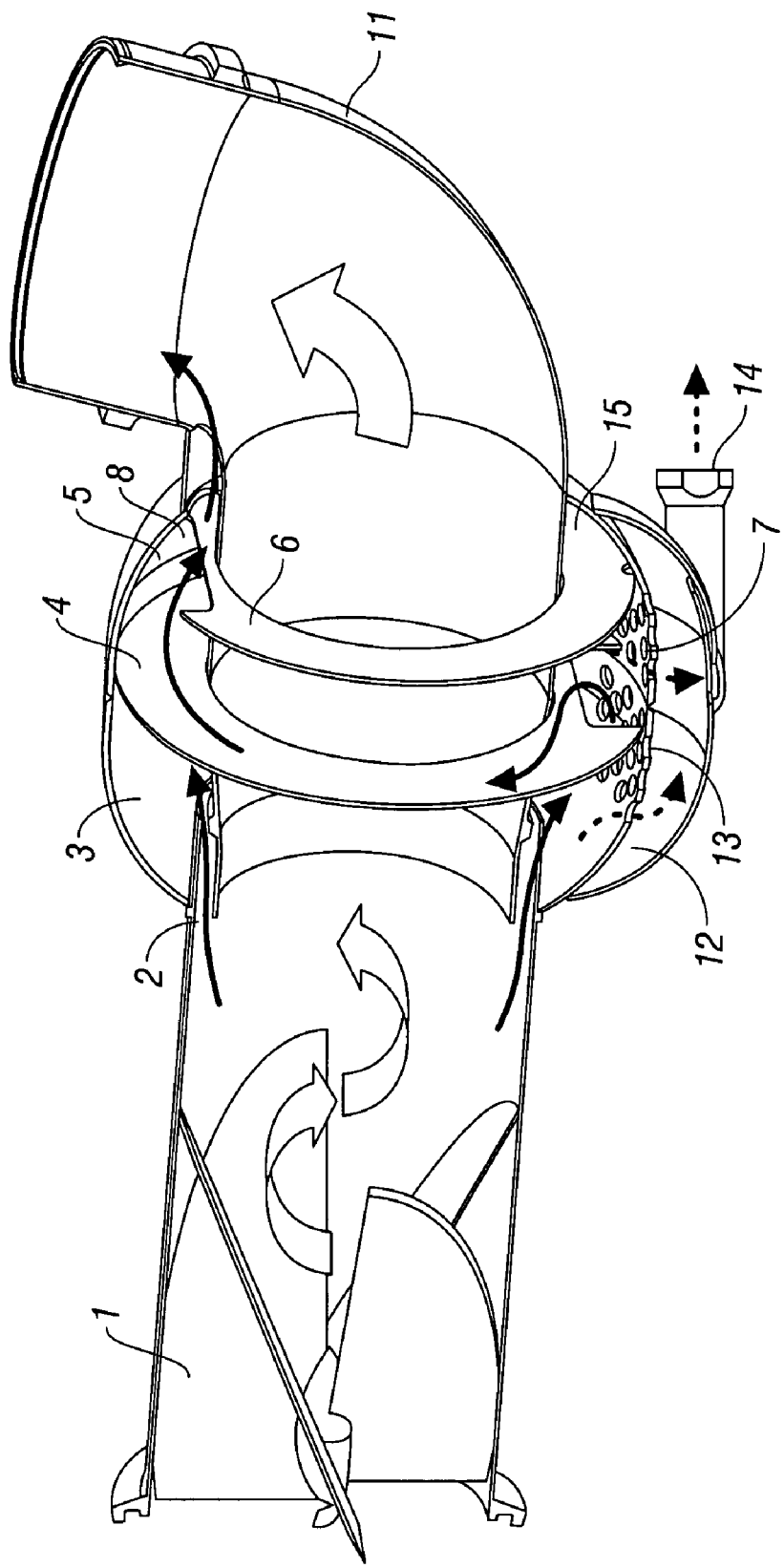
Figure 3:
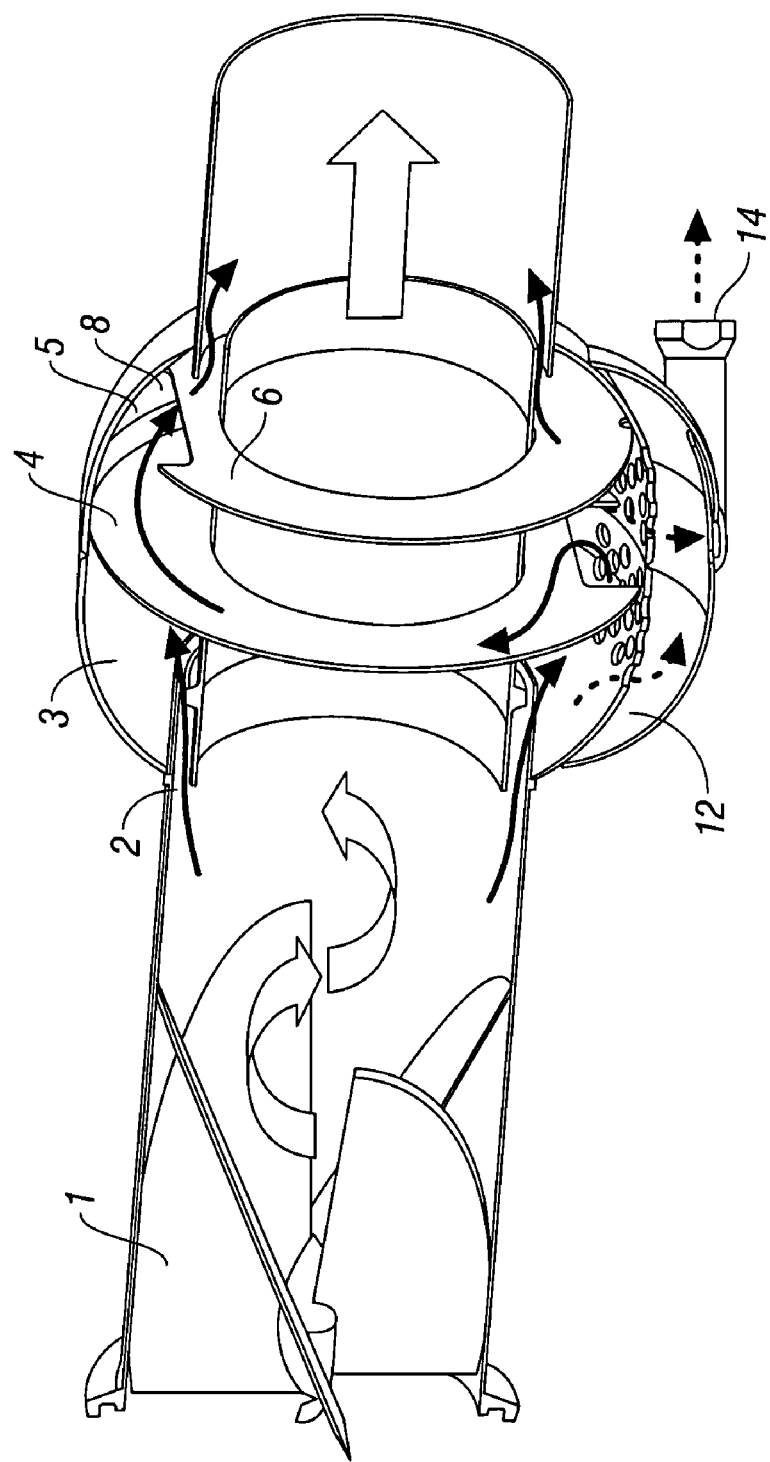

FIG. 1: shows the section through a first aspect of the invention in accordance with the invention;

FIG. 2: shows a partly sectioned, perspective view in accordance with FIG. 1; and FIG. 3: shows a perspective view of an embodiment of the invention in a modification with respect to the embodiment variant in accordance with FIGS. 1 and 2.

In the embodiment variant of the drop separator shown in FIG. 1, a rotary movement superimposition is imparted to a moist air mass flow by a swirl generator 1, whereby water drops are transported to the inner wall of a cylindrical tube and are separated from the moist primary mass flow by a downstream peripheral annular gap 2 and are transported into a first stage 3 of a separation chamber. The end of the first stage 3 is defined by a baffle surface 4 onto which the separated water drops impact after the separation from the primary mass flow. They flow off into a so-called separator sump 12 following the direction of gravity at the surface of the baffle surface 4. The separator sump 12 is located at the lower side of the multistage chamber in the direction of gravity and extends, in accordance with the embodiment shown here, in the longitudinal direction over the width of the first and second stages. The entry into the separator sump can be formed by a perforation 13 of the passage housing which the sump 12 adjoins.

The impact surface 4 bounding the first stage additionally has at least one aperture 7, preferably made as a window, which is arranged directly above the entry into the separator sump 12. An air mass flow communication between the first stage 3 and the second stage 5 of the separation chamber is formed by the window.

The second stage 5 satisfies the function of a deposition chamber. The venting mass flow is sucked through the second stage 5 in the direction facing away from the separator sump 12, with the flow speed of the venting mass flow in this stage having to be so low that water drops which are swept along are not conveyed along into the third stage 15. The venting mass flow is again delivered to the dried primary mass flow by means of a bypass line 10 between the third stage 15 of the chamber, with alternative forms of extraction by using an internal or external pressure sink being feasible.

Extensive experimental investigations have shown that up to 5% higher degrees of separation can be achieved by a direct venting of the chamber. The venting of the chamber in particular allows a clear increase in the achievable degree of separation with respect to a chamber embodiment without venting with increased flow throughputs. It must, however, be prevented that it is no longer possible to have a complete separation of air and water and already accumulated drops of the first stage are again sucked along due to too large a venting mass flow in the deposition stage of the chamber. The maximum venting mass flow therefore undergoes a limitation in amount for given operating conditions.

The third stage 15 serves the positionally independent flow return of the venting above the diameter of the chamber. The flow guidance between the second and third stages takes place by at least one aperture 8 arranged opposite the sump 12 in the partition wall 6 between the second and third stages and preferably made as a window.

The venting mass flow is again delivered to the primary mass flow downstream of the third stage 15 of the chamber. The venting mass flow is sucked through the multistage chamber and the pressure level in the separation chamber is lowered by a pressure sink, for example by forming an ejector. Different solution approaches can be selected for the design of the extraction.

The water collected in the sump 12 is drained off through a discharge stub 14.

The extraction can be realized by different embodiments.

The pressure sink used for the venting of the chamber can be solved as follows. First, the venting can take place by returning into the dried primary mass flow.

In this embodiment, some of the moist primary mass flow flows through the three-stage chamber together with the separated water, with a secondary separation of the two phases taking place in the second stage and the part of the secondary flow dried thereby is again delivered to the primary mass flow downstream of the secondary stage of the chamber by suitable measures (e.g. by an ejector). The chamber venting downstream of the second stage can, for example, be made in the form of an inverse Pitot tube which acts in accordance with the ejector principle, with the extraction apparatus selectively being able to be arranged in the second stage or in the third stage of the chamber.

Alternatively to this, a venting effect can also take place—instead of the inverse Pitot tube—by utilization of a low pressure level at the inner radius of a manifold disposed after the drop separator, as is shown in FIGS. 1 and 2. The low pressure level is created due to the mass inertia of the air and of the deflection in the manifold. A connection, for example a piece of tube, between the second or third chamber stage with the low pressure level at the inner radius of the manifold is sufficient to achieve the desired venting.

An alternative variant is the extraction by means of a peripheral annular gap such as is shown in the embodiment variant in accordance with FIG. 3. The annular gap adjoins the third stage of the chamber and thus establishes a flow communication between the chamber and the primary mass flow. An adaptation of the required venting mass flow can take place by an aperture 8 in the partition wall 6.

These embodiments have the advantage that the leak air portion is reduced to a minimum since the air mass flow separated off with the water portion can be delivered to the air side to a large extent. Only a low air mass portion exits the separator with the separated water through the discharge stub 14.

As an alternative form of venting, a direct venting of the chamber by utilizing the pressure sink between the process air side and the environmental air can also be selected. This variant can be used wherever an additional leak air portion of the process air (primary mass flow) to the leak air portion through the discharge stub 14 cannot be accepted.

As a further possibility, the air mass flow can be delivered to an external mass flow with a lower pressure level. The possibility exists in this connection for the application in an aircraft air-conditioning system of carrying out the venting into the process air side, with the leaking of the system not being negatively influenced. However, for this purpose, it must be ensured that the tapped pressure level assumes lower values over all operating ranges than the chamber of the separator.

As an alternative to this, a venting into the ram air passage of an aircraft air-conditioning system can also take place, with corresponding apparatus (ejector, anti-Pitot tube, etc.) also being necessary for this purpose in order to be able to set a defined venting mass flow. However, in this variant, a somewhat increased leak air portion must be accepted.

The invention claimed is:

1. A water separator for air-conditioning systems, preferably for aircraft air-conditioning systems, comprising:
    a swirl generator;
    a housing surrounding it
    a separation chamber arranged around the housing for the collection of the water deposited at the inner wall of the housing which opens into a separation sump; and
    at least one aperture provided toward the separation chamber in the housing,
characterized in that
the separation chamber is made in multistage form, with the first stage of the separation chamber serving the accumulation of the water drops, the second stage of the separation chamber serving the deposition of the accumulated water drops and the third stage of the separation chamber serving the extraction of the air mass flow.

2. A water separation in accordance with claim 1, wherein the three stages of the separation chamber are formed in that a baffle surface separates the first stage from the second stage; and in that a partition wall separates the second stage from the third stage.

3. A water separator in accordance with claim 2, wherein at least one respective opening is provided in the baffle surface separating the first stage from the second stage, on the one hand, and in the partition wall separating the second stage from the third stage, on the other hand.

4. A water separator in accordance with claim 1, wherein the three stages and their associated functions are realized in assemblies separated from one another.

5. A water separator in accordance with claim 1, wherein the extraction of the air mass flow from an assembly downstream of the second stage takes place by internal delivery into the primary mass flow.

6. A water separator in accordance with claim 5, wherein the internal extraction of the air mass flow and the internal delivery into the primary mass flow takes place by means of an anti-Pitot tube.

7. A water separator in accordance with claim 5, wherein the internal extraction of the air mass flow and the internal delivery into the primary mass flow takes place by means of tapping the inner radius of a downstream manifold.

8. A water separator in accordance with claim 5, wherein the internal extraction of the air mass flow and the internal delivery into the primary mass flow takes place by means of an ejector in the shape of an annular gap.

9. A water separator in accordance with claim 1, wherein the extraction of the air mass flow from an assembly downstream of the second stage takes place by venting into the environmental air.

10. A water separator in accordance with claim 1, wherein the extraction of the air mass flow from an assembly downstream of the second stage takes place by delivery into an external mass flow.

11. A water separator in accordance with claim 10, wherein the external mass flow is the process air side of an aircraft air-conditioning plant.

* * * * *